US012258208B2

(12) United States Patent
Han

(10) Patent No.: US 12,258,208 B2
(45) Date of Patent: Mar. 25, 2025

(54) COLLAPSIBLE TRASH CAN

(71) Applicant: Ningbo Shunda Sunrise Electric Co., Ltd., Yuyao (CN)

(72) Inventor: Anqing Han, Yuyao (CN)

( * ) Notice: Subject to any disclaimer, the term of this patent is extended or adjusted under 35 U.S.C. 154(b) by 148 days.

(21) Appl. No.: 18/057,638

(22) Filed: Nov. 21, 2022

(65) Prior Publication Data

US 2024/0150116 A1 May 9, 2024

(51) Int. Cl.
*B65F 1/14* (2006.01)
*B65F 1/16* (2006.01)

(52) U.S. Cl.
CPC .......... *B65F 1/1426* (2013.01); *B65F 1/1646* (2013.01); *B65F 2210/183* (2013.01); *B65F 2230/116* (2013.01)

(58) Field of Classification Search
CPC .. B65F 1/1426; B65F 2220/106; B65D 11/18; B65D 11/1866; B65D 11/1873
See application file for complete search history.

(56) References Cited

U.S. PATENT DOCUMENTS 4,874,106 A * 10/1989 Robbins, III .......... B65D 11/02 229/5.5
4,923,080 A * 5/1990 Lounsbury ................ B65F 1/06 220/908
8,342,461 B2 * 1/2013 Sutphen .................... B65F 1/06 220/796
2022/0306380 A1 * 9/2022 Martin Herrero .... B65F 1/1473

* cited by examiner

*Primary Examiner* — Andrew T Kirsch
(74) *Attorney, Agent, or Firm* — Clement Cheng

(57) ABSTRACT

A trashcan has collapsible storage in a storage mode, and also has a deployed mode. The trashcan has a base with an insertion channel. Panels include a front side panel, a rear side panel, a right side panel, and a left side panel. The front side panel and the rear side panel have a curved structure and each have a pair of engaging rails. The right side panel and the left side panel each have a pair of engaging rails. The front side panel has a front side panel first engaging rail and a front side panel second engaging rail. The rear side panel has a rear side panel first engaging rail and a rear side panel second engaging rail.

13 Claims, 7 Drawing Sheets

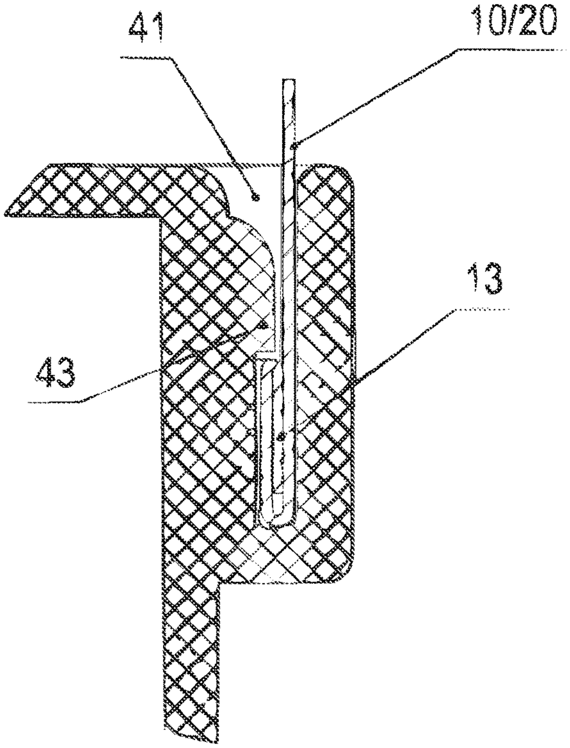
Fig. 6
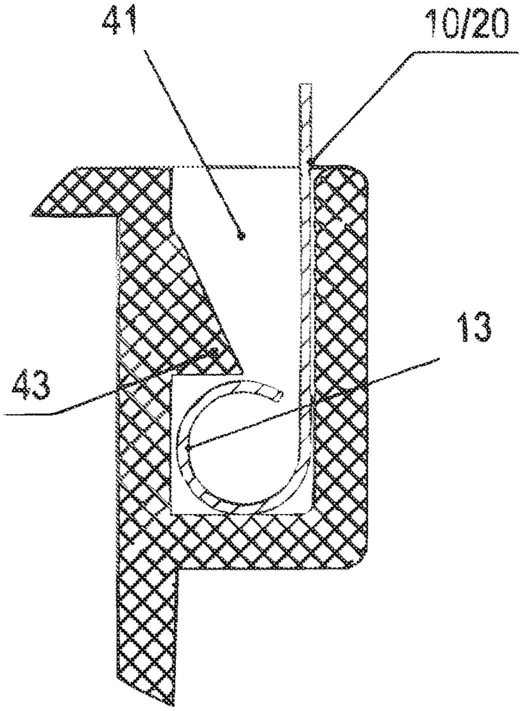
Fig. 7
Fig. 8
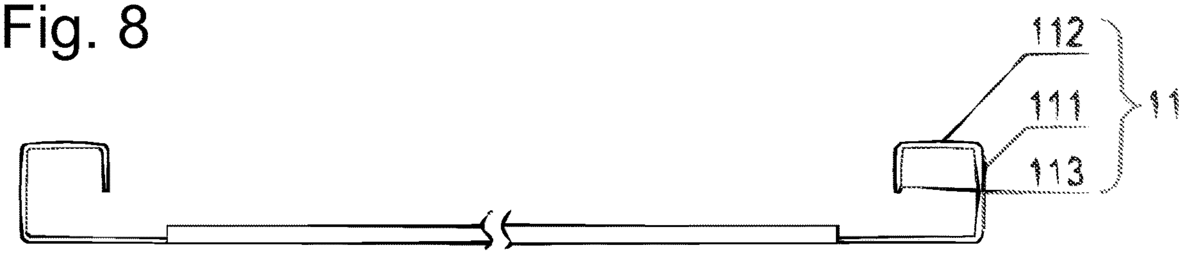

COLLAPSIBLE TRASH CAN

This application claims priority from China application 2022222895894 filed Nov. 4, 2022, entitled Trash Can by same inventor Anqing Han, the disclosure of which is incorporated by reference.

FIELD OF INVENTION

The present invention is in the field of trash cans.

DISCUSSION OF RELATED ART

Indoor environment such as homes and offices and sometimes outdoor environments need to be equipped with small trash cans to hold garbage. These traditional trash cans have a large volume relative to their weight making shipping and storage cumbersome. Thus, a variety of different collapsible trash cans provide for storage of trash cans when not in use.

SUMMARY OF INVENTION

It is an object of the present invention to reduce the packing volume of a trashcan and allow collapsible storage in a storage mode, and then allow a deployed mode. A collapsible trashcan has a base with an insertion channel. Panels include a front side panel, a rear side panel, a right side panel, and a left side panel. The front side panel and the rear side panel have a curved structure and each have a pair of engaging rails. The right side panel and the left side panel each have a pair of engaging rails. The front side panel has a front side panel first engaging rail and a front side panel second engaging rail. The rear side panel has a rear side panel first engaging rail and a rear side panel second engaging rail. In a deployed mode the front side panel first engaging rail engages the right side panel, and the front side panel second engaging rail engages the left side panel. In the deployed mode the rear side panel first engaging rail engages the right side panel and the rear side panel second engaging rail engages the left side panel. In the deployed mode the front side panel, the rear side panel, the right side panel, and the left side panel are vertically oriented. In the stowed mode the front side panel first engaging rail engages the rear side panel first engaging rail and the front side panel second engaging rail engages the rear side panel second engaging rail.

The upper frame has an upper frame insertion channel that receives a front side panel upper edge of the front side panel, a rear side panel upper edge of the rear side panel, and a right side panel upper edge of the right side panel, and a left side panel upper edge of the left side panel. A snap fit retainer can be formed in the upper insertion channel. The lid frame has a lid hatch, and the lid frame fits over and secures to the upper frame. Legs attach to the base and include a first leg, a second leg, a third leg, and a fourth leg. The side panels have side panel engaging rails forming four retainer strip junctions when panel retainer clips retain the side panel engaging rails to the front panel engaging rails and the rear panel engaging rails.

The four retainer strip junctions each include a first engaging rail contact face extending from a first panel, and a second engaging rail contact face extending from a second panel and further including a panel retainer clip biasing the first engaging rail contact face to the second engaging rail contact face. A first engaging rail inside face extends at a right angle from the first engaging rail contact face, and a second engaging rail inside face extends at a right angle from the second engaging rail contact face. The panel retainer clip biases the first engaging rail inside face toward the second engaging rail inside face. A first engaging rail tip extends at a right angle from the first engaging rail inside face, a second engaging rail tip extending at a right angle from the second engaging rail inside face. The panel retainer clip further includes a first extending tip extending around the first engaging rail tip. The panel retainer clip further includes a second extending tip extending around the second engaging rail tip. A snap fit retainer is preferably formed in the insertion channel.

BRIEF DESCRIPTION OF THE DRAWINGS

FIG. 6 is a cross-section diagram of a snap fit retainer for a side panel lower edge, which can also be a cross section diagram of a snap fit retainer for a side panel upper edge.

FIG. 7 is a cross-section diagram of a snap fit retainer for a side panel lower edge, which can also be a cross section diagram of a snap fit retainer for a side panel upper edge.

FIG. 8 is top view of a panel showing the engaging rail.

Figure 1:
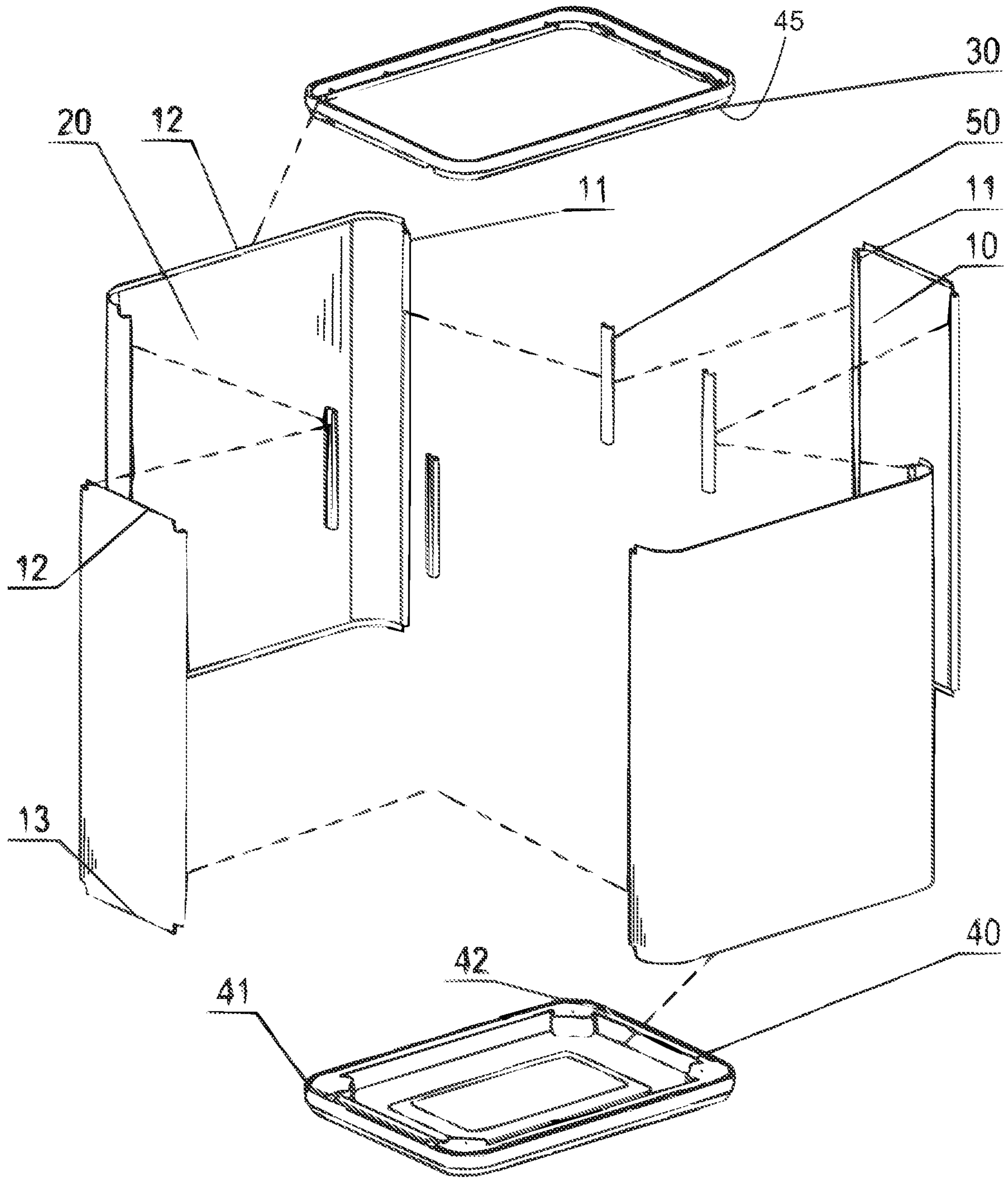
FIG. 1 is an exploded view of the present invention.

The following call out list of elements can be a useful guide in referencing the element numbers of the drawings.

10 side panel
11 engaging rail
12 side panel upper insertion edge
13 side panel lower insertion edge
14 first engaging rail tip
15 second engaging rail tip
16 first engaging rail inside face
17 second engaging rail inside face
18 first engaging rail contact face
19 second engaging rail contact face
111 engaging rail contact extension
112 engaging rail inside extension
113 extending tip edge
20 curved side panel
21 front side panel
22 rear side panel
23 right side panel
24 left side panel
25 retainer strap junction
201 front side panel first engaging rail
202 front side panel second engaging rail
203 rear side panel first engaging rail
204 rear side panel second engaging rail
30 upper frame
40 base
41 insertion channel
42 base storage slot
43 snap fit retainer
45 upper frame storage indent
46 front right leg socket
47 front left leg socket
48 rear right leg socket
49 rear left leg socket 50 panel retainer clips
51 first extending arm
52 second extending arm
53 first extending tip
54 second extending tip
55 first channel
56 second channel
60 lid frame
61 lid hatch
62 lid hatch sensor
63 lid hatch indicator
70 legs
71 first leg
72 second leg
73 third leg
74 fourth leg
80 storage container
81 first packaging panel
82 second packaging panel
83 third packaging panel
84 fourth packaging panel
85 storage container hollow
91 first panel
92 second panel
93 first engaging rail
94 second engaging rail

DETAILED DESCRIPTION OF THE PREFERRED EMBODIMENT

As shown in FIG. 1, embodiments of the present invention provide a collapsible trash can, comprising a plurality of side panels 10, a base 40, and an upper frame 30. The upper frame is formed as a hollow rectangular ring structure. The side panels are vertically oriented and fit with the curved side panel 20.

Assembly begins with a base 40 having an insertion channel 41 which receives vertical panels. In a stowed mode, the upper frame 30 has an upper frame storage indent 45 that engages a base storage slot 42 of the base 40. When a user transforms the trashcan from stowed mode to deployed mode, the user first removes the base 40 and inserts the pair of side panels 10, then the curved side panels 20 into the insertion channel 41. The insertion channel 41 is formed on the periphery of the base 40. Pair of side panels 10 and the curved side panels 20 have engaging rails 11 that clip to each other via four panel retainer clips 50. The side panel lower edge 13 inserts into the insertion channel 41. The upper insertion edge 12 analogously fits into an insertion channel 41 of the upper frame 30. The upper insertion channel of the upper frame and the lower insertion channel of the base can be congruent or symmetrical. After the user installs the panels onto the base, the user slides the panel retainer clips over the pair of engaging rails to lock the four sidewalls together.

Figure 2:
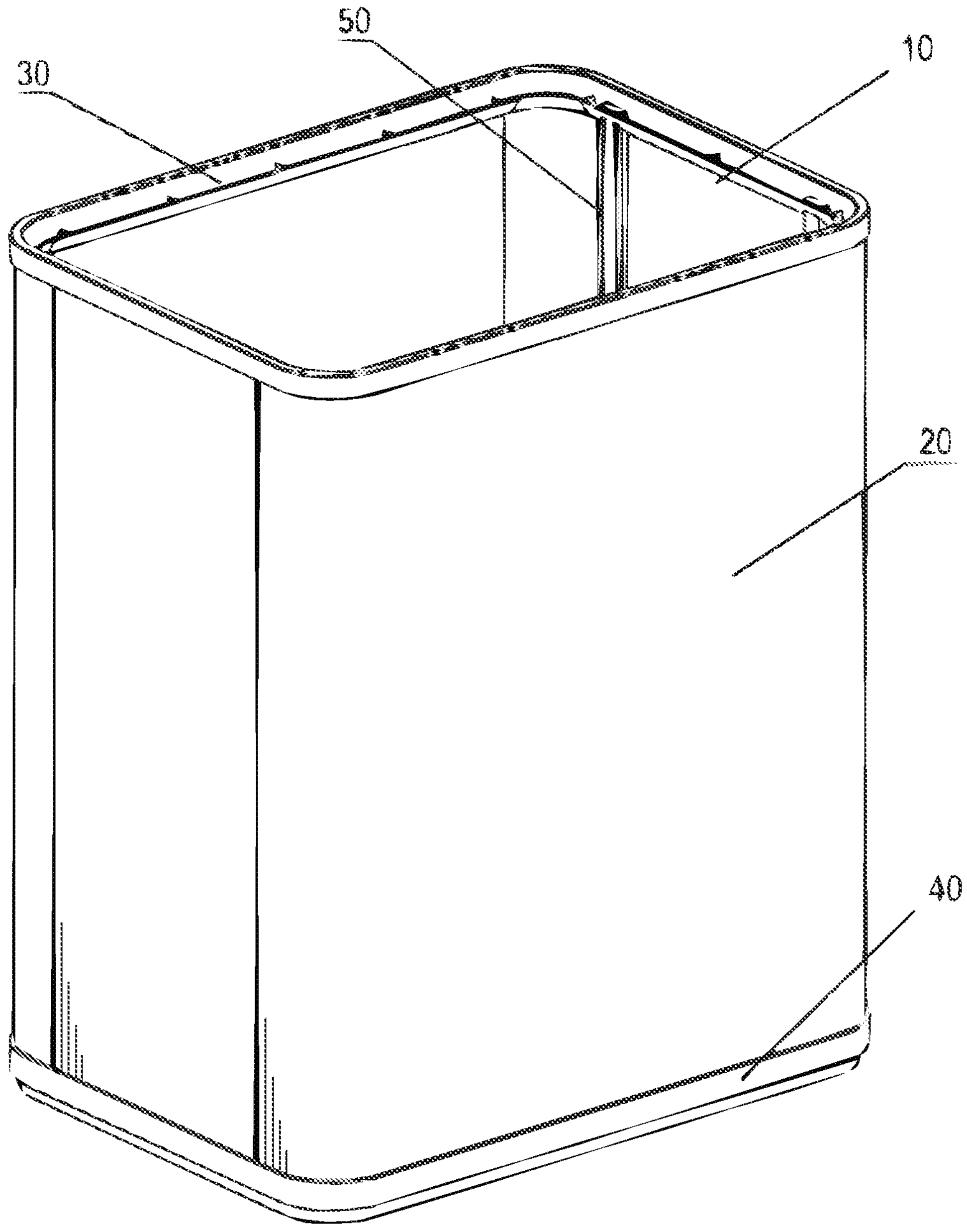
FIG. 2 is a partially assembled view of the present invention.

As seen in FIG. 2, the upper frame 30 benefits over the side panel 10 and the curved side panel 20 and the panel retainer clips 50. The upper frame 30 can have indents that receive the upper tips of the panel retainer clips 50 and the upper edges of the engaging rails 11. The user presses the upper frame 30 downwardly onto the base 40.

Figure 3:
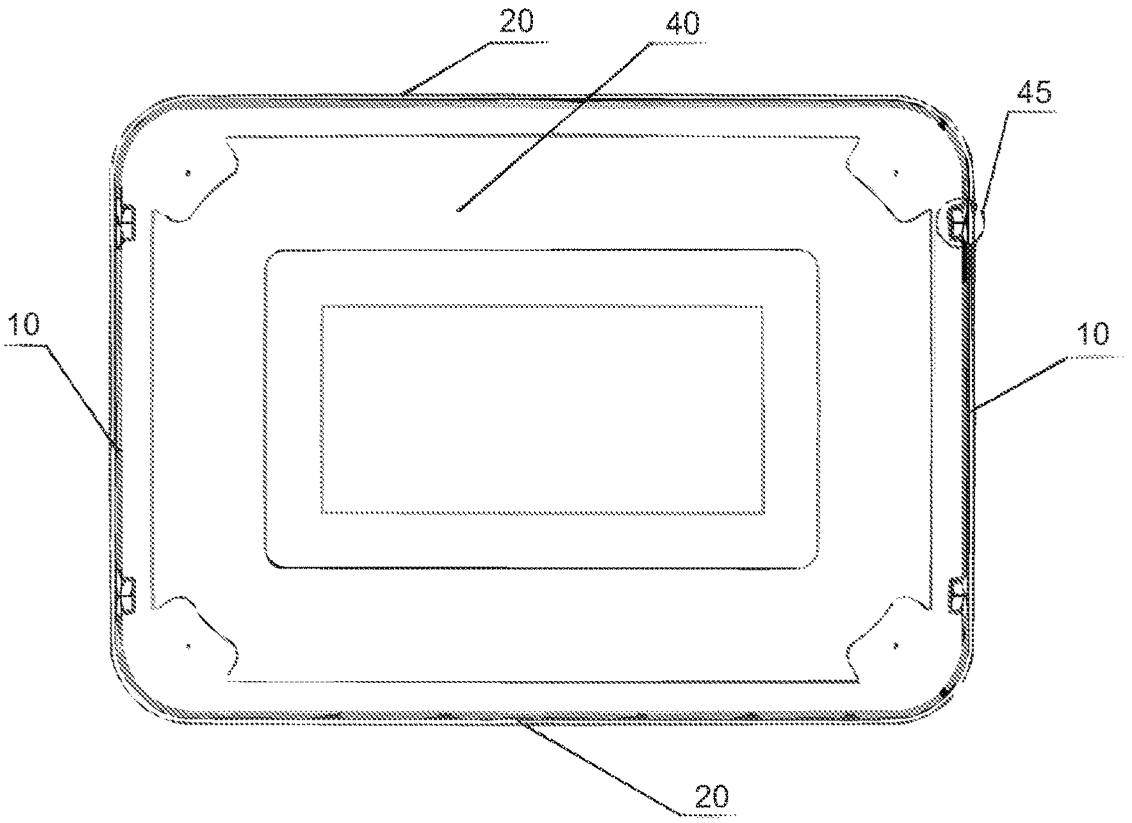
FIG. 3 is a top view of the partially assembled view of the present invention.

As seen in FIG. 3, the panels include a front side panel 21, a rear side panel 22, a right side panel 23, and a left side panel 24. The base 40 also has a molded set of indents for the legs, namely a front right leg socket 46, a front left leg socket 47, a rear right leg socket 48, and a rear left leg socket 49. Each of the leg sockets may have an opening for a screw or other similar type of connector for connecting the socket and base to the legs. The retainer clip junction 25 has detail that is shown in FIG. 4.

Figure 4:
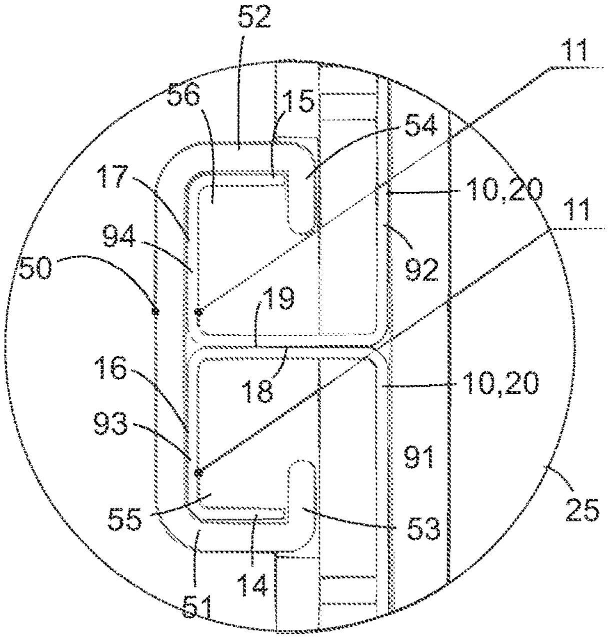
FIG. 4 is an enlarged section of the retainer strip junction.

As seen in FIG. 4, the side panel 10 or the curved side panel 20 can connect to a side panel 10 or another curved side panel 20. The curved side panels 20 are connected to each other in the stowed mode, and the curved side panels 20 have a side panel 10 between them in the deployed mode.

The first panel has a first engaging rail contact face 18 that contacts a second engaging rail contact face 19 of the second panel. The first engaging rail contact face 18 is parallel to the second engaging rail contact face 19. The engaging rail 11 then has a first engaging rail inside face 16 extending at a right angle to the first engaging rail contact face 18, while the second engaging rail inside face 17 extends at a right angle to the second engaging rail contact face 19. The first engaging rail inside face 16 is preferably parallel to and flush to the second engaging rail inside face 17. The first engaging rail tip 14 extends at a right angle from the first engaging rail inside face 16 and extends toward the first panel 91. The second engaging rail tip 15 extends at a right angle from the second engaging rail inside face toward the second panel 92.

The retainer clip junction 25 shows how the first panel 91 is connected to the second panel 92. After aligning the first panel 91 to the second panel 92, a user slides panel retainer clips 50 over the pair of engaging rails 11. The first engaging rail 93 has a first channel 55, and the second engaging rail 94 has a second channel 56. The engaging rails are biased toward each other such that the first engaging rail contact face 18 abuts the second engaging rail contact face 19. The panel retainer clips 50 have a first extending arm 51 that extends along the first engaging rail inside face 16 and the first engaging rail tip 14. Similarly, a second extending arm 52 extends along the second engaging rail inside face 17 and the second engaging rail tip 15. The first extending arm 51 ends with a first extending tip 53 that bends around and locks to the first engaging rail tip 14. Similarly, the second extending arm 51 ends with a second extending tip 54 the bends around and locks to the second engaging rail tip 15. Preferably, the first extending tip 53 biases toward the second extending tip 54 so as to clip the pair of engaging rails 11 together.

Figure 5:
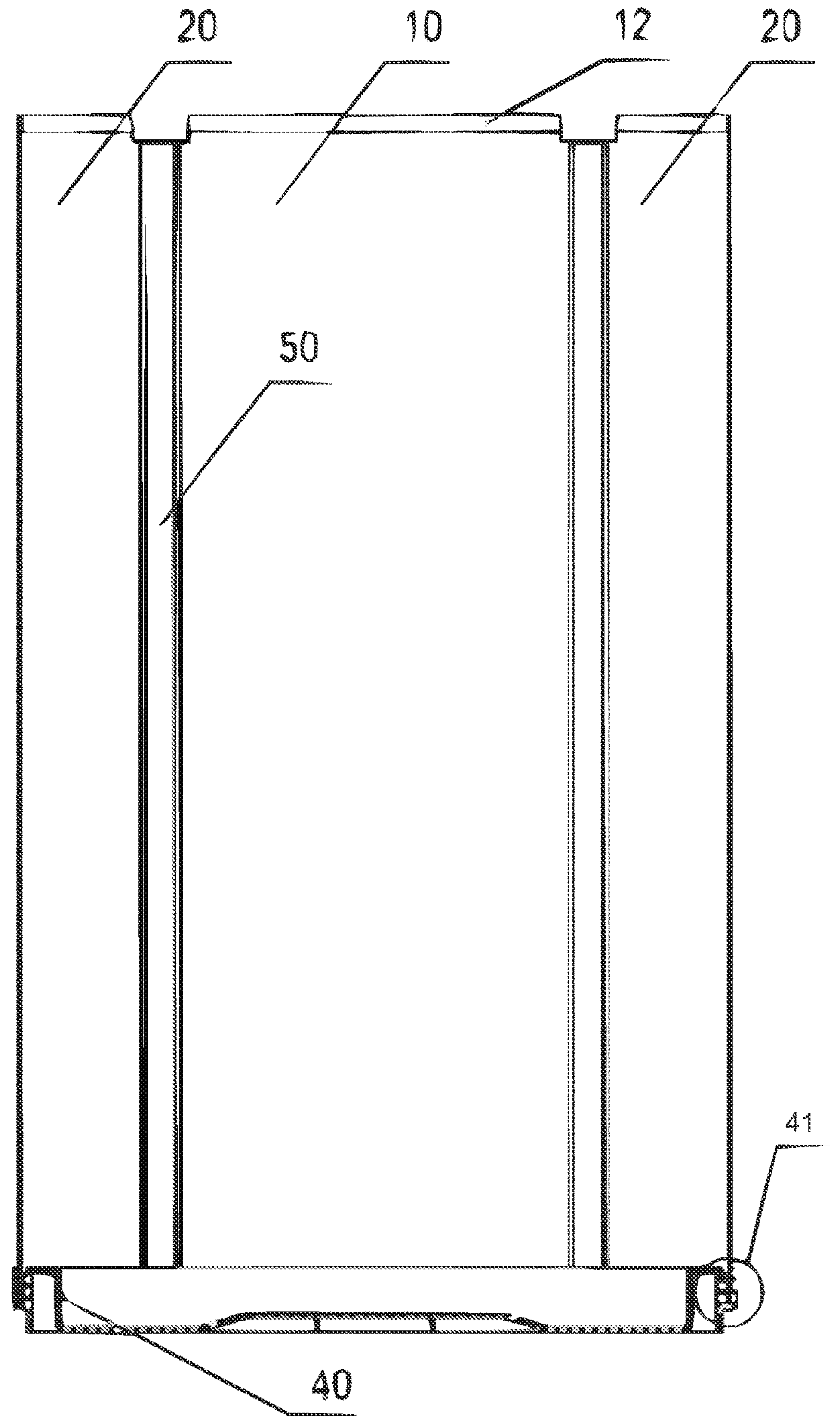
FIG. 5 is a cross-sectional view of the side panel and the base assembled in an embodiment of the present invention.

As seen in FIG. 5, the panel retainer clips 50 can be full-length and connect a side panel 10 to a pair of curved side panels 20 at a lower insertion channel 41 of the base 40. Similarly, the side panel upper edge 12 can engage the upper frame 30.

As seen in FIG. 6, the insertion channel 41 can receive a curved side panel 20 or a side panel 10 in a snap fit retainer 43. The snap fit retainer 43 can be formed as a protrusion on the insertion channel 41 which hooks onto and retains a side panel lower edge. The side panel lower edge can be a double folded rim of the side panel 10 or the curved side panel 20. The snap fit retainer 43 can be sized to allow removal, such as in case of user error during assembly, or when the user wants to convert the collapsible trashcan from the deployed mode to the stowed mode. The side panel lower edge 13 is slightly thicker than the side panel.

As seen in FIG. 7, the insertion channel 41 can permanently receive a side panel when the side panel lower edge 13 is formed as a larger curved structure. Again, the snap fit retainer 43 can be sized to allow manual removal, or removal with tools.

As seen in FIG. 8, a top view of the panel shows that the panel extends outwardly with an engaging rail contact extension 111, then an engaging rail inside extension, then ending at an extending tip edge 113.

Figure 9:
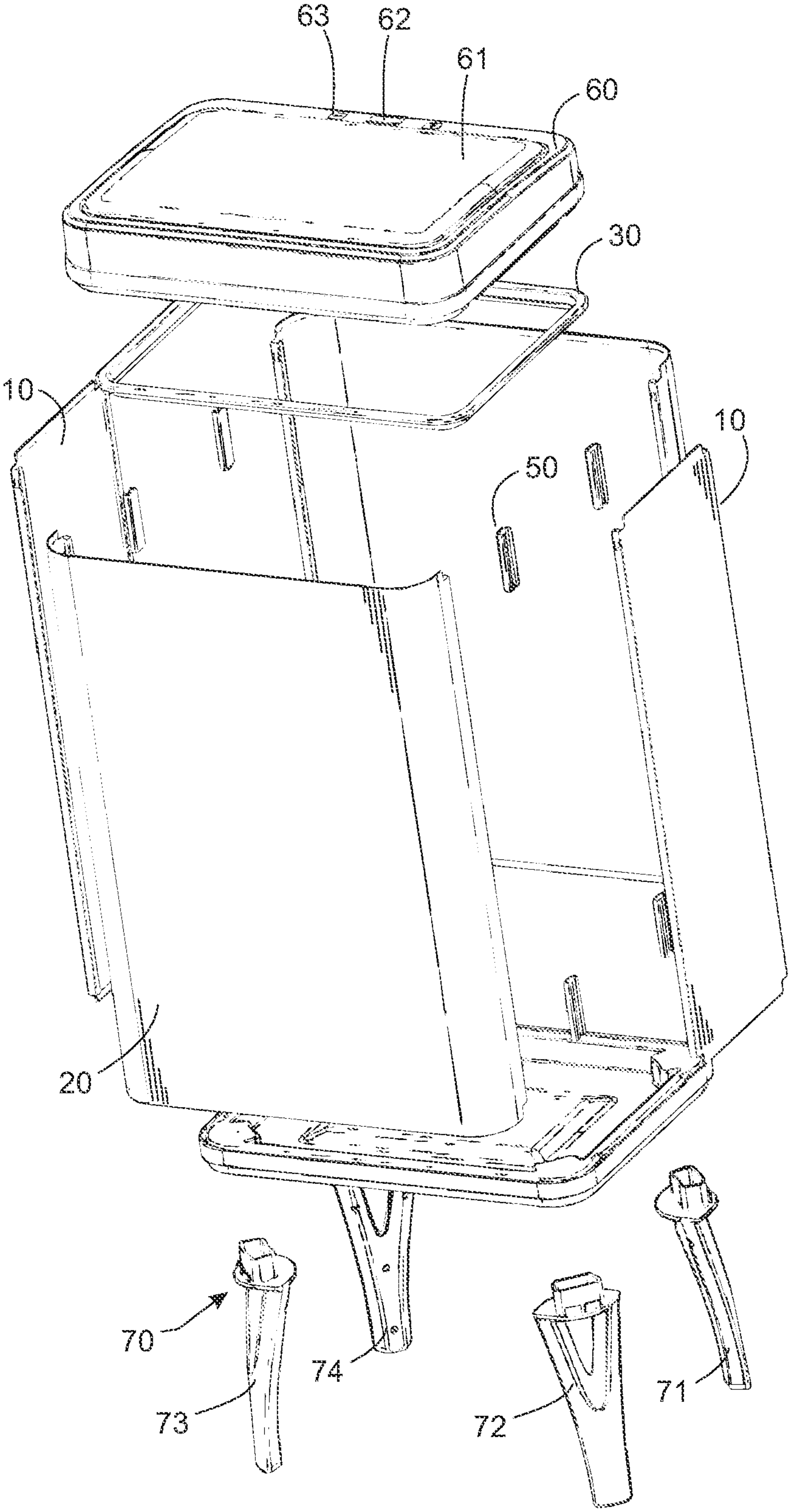
FIG. 9 is an exploded view of the present invention showing attachment of the lid frame and legs.

As seen in FIG. 9, the lid frame 60 has a lid hatch 61, a lid hatch sensor 62 and a lid hatch indicator 63. The lid frame 60 fits over the upper frame 30. The legs 70 can also be attached to the base, including a first leg 71, a second leg 72, a third leg 73, and a fourth leg 74.

Figure 10:
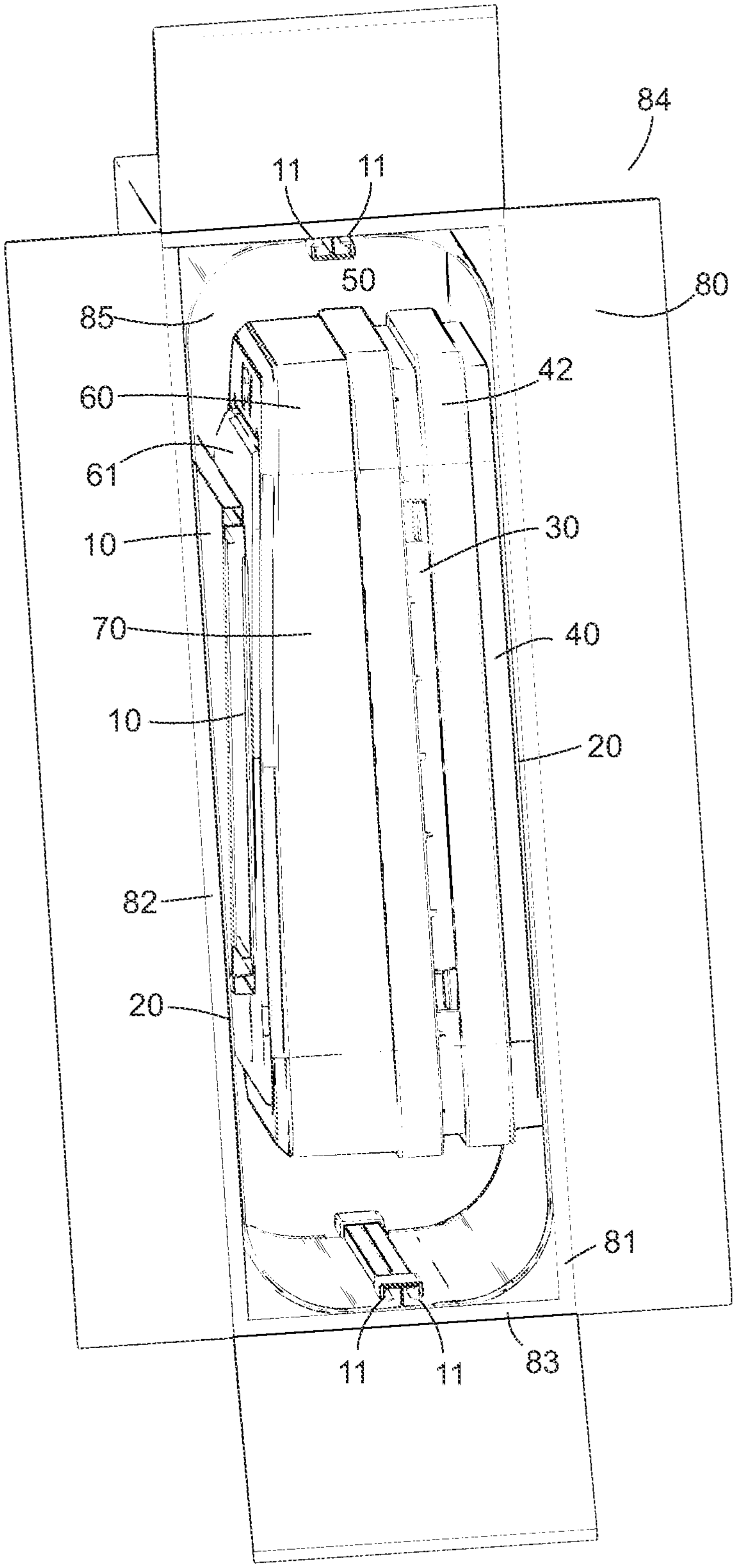
FIG. 10 shows the stowed mode of the present invention.

As seen in FIG. 10, a stowed mode of the collapsible trashcan includes a storage container 80 having a first packaging panel 81, a second packaging panel 82, a third packaging panel 83, and a fourth packaging panel 84 for protecting the contents. The base 40 and the lid frame 60 sandwich the upper frame 30. The legs 70 can be placed inside the lid frame 60. The storage slot 42 engages the upper frame 30. The panel retainer clips 50 can be formed as short clips or as long strips. The length of the panel retainer clips, which can be formed as panel retainer strips can be sized according to the biasing force desired. The panel retainer clips can be formed of a folded panel of metal. The curved side panel 20 has a pair of bends such that its engaging rails 11 extend at a right angle. A pair of curved side panels 20 can thus be clipped together using clip formed as a short clip or a long strip. Panel retainer strips are preferred for larger more permanent panel structures, while panel retainer clips are preferred for smaller structures that are easier to take down. The storage container hollow 85 is formed between the pair of curved side panels 20. The flat side panels 10 can rest between the lid and the second package panel 82. The rounded corners of the curved side panels 20 provide structure to protect the fragile plastic parts inside including the base 40, and the upper frame 30.

By having a deployed mode and a stowed mode, the user can have a storage option for their trashcan when not in use and receive a smaller shipping package.

The invention claimed is:

1. A collapsible trashcan comprising:

a. a base having an insertion channel;

b. a plurality of panels including a front side panel, a rear side panel, a right side panel, and a left side panel, wherein the front side panel and the rear side panel have a curved structure and each have a pair of engaging rails, wherein the right side panel and the left side panel each have a pair of engaging rails, wherein the front side panel has a front side panel first engaging rail and a front side panel second engaging rail, wherein the rear side panel has a rear side panel first engaging rail and a rear side panel second engaging rail;

c. panel retainer strips;

d. a deployed mode, wherein in the deployed mode a first panel retainer strip secures the front side panel first engaging rail to engage the right side panel, and a second panel retainer strip secures the front side panel second engaging rail to engage the left side panel, wherein in the deployed mode a third panel retainer strip secures the rear side panel first engaging rail to engage the right side panel and a fourth panel retainer strip secures the rear side panel second engaging rail to engage the left side panel, wherein in the deployed mode the front side panel, the rear side panel, the right side panel, and the left side panel are vertically oriented and connected using the panel retainer strips; and e. a stowed mode, wherein in the stowed mode, the first panel retainer strip secures the front side panel first engaging rail to engage the rear side panel first engaging rail and the second panel retainer strip secures the front side panel second engaging rail to engage the rear side panel second engaging rail, wherein the front side panel first engaging rail extends inwardly to a storage container hollow, wherein the rear side panel first engaging rail extends inwardly to the storage container hollow, wherein the front side panel second engaging rail extends inwardly to the storage container hollow, wherein the rear side panel second engaging rail extends inwardly to the storage container hollow, wherein the container storage hollow is formed between the front side panel and the rear side panel, wherein the side panels have side panel engaging rails forming four retainer strip junctions when panel retainer clips retain the side panel engaging rails to the front panel engaging rails and the rear panel engaging rails.

2. The collapsible trashcan of claim 1, wherein the four retainer strip junctions each include a first engaging rail contact face extending from a first panel, and a second engaging rail contact face extending from a second panel and further including a panel retainer clip biasing the first engaging rail contact face to the second engaging rail contact face.

3. The collapsible trashcan of claim 2, further including a first engaging rail inside face extending at a right angle from the first engaging rail contact face, and further including a second engaging rail inside face extending at a right angle from the second engaging rail contact face, wherein the panel retainer clip biases the first engaging rail inside face toward the second engaging rail inside face.

4. The collapsible trashcan of claim 3, further including a first engaging rail tip extending at a right angle from the first engaging rail inside face, and further including a second engaging rail tip extending at a right angle from the second engaging rail inside face, wherein the panel retainer clip further includes a first extending tip extending around the first engaging rail tip, and wherein the panel retainer clip further includes a second extending tip extending around the second engaging rail tip.

5. The collapsible trashcan of claim 1, further including a snap fit retainer formed in the insertion channel.

6. The collapsible trashcan of claim 5, further including an upper frame, wherein the upper frame has an upper frame insertion channel that receives a front side panel upper edge of the front side panel, a rear side panel upper edge of the rear side panel, and a right side panel upper edge of the right side panel, and a left side panel upper edge of the left side panel.

7. The collapsible trashcan of claim 6, further including a snap fit retainer formed in the insertion channel.

8. The collapsible trashcan of claim 5, further comprising a lid frame having a lid hatch, wherein the lid frame fits over and secures to the upper frame.

9. The collapsible trashcan of claim 5, further including legs attached to the base, wherein the legs include a first leg, a second leg, a third leg, and a fourth leg.

10. The collapsible trashcan of claim 5, wherein the side panels have side panel engaging rails forming four retainer strip junctions when panel retainer clips retain the side panel engaging rails to the front panel engaging rails and the rear panel engaging rails.

11. The collapsible trashcan of claim 10, wherein the four retainer strip junctions each include a first engaging rail contact face extending from a first panel, and a second engaging rail contact face extending from a second panel and further including a panel retainer clip biasing the first engaging rail contact face to the second engaging rail contact face.

12. The collapsible trashcan of claim 11, further including a first engaging rail inside face extending at a right angle from the first engaging rail contact face, and further including a second engaging rail inside face extending at a right angle from the second engaging rail contact face, wherein the panel retainer clip biases the first engaging rail inside face toward the second engaging rail inside face.

13. The collapsible trashcan of claim 12, further including a first engaging rail tip extending at a right angle from the first engaging rail inside face, and further including a second engaging rail tip extending at a right angle from the second engaging rail inside face, wherein the panel retainer clip further includes a first extending tip extending around the first engaging rail tip, and wherein the panel retainer clip further includes a second extending tip extending around the second engaging rail tip.

* * * * *